US011941364B2

(12) United States Patent
Pandit et al.

(10) Patent No.: US 11,941,364 B2
(45) Date of Patent: Mar. 26, 2024

(54) CONTEXT-DRIVEN ANALYTICS SELECTION, ROUTING, AND MANAGEMENT

(71) Applicant: International Business Machines Corporation, Armonk, NY (US)

(72) Inventors: Sushain Pandit, Austin, TX (US);
Andrew T. Penrose, Castleknock (IE);
Rory O Donnell, Dublin (IE); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 17/463,658

(22) Filed: Sep. 1, 2021

(65) Prior Publication Data
US 2023/0067828 A1    Mar. 2, 2023

(51) Int. Cl.
 *G06F 40/30*    (2020.01)
 *G06F 16/23*    (2019.01)
 *G06F 40/284*    (2020.01)

(52) U.S. Cl.
 CPC .......... *G06F 40/30* (2020.01); *G06F 16/2379* (2019.01); *G06F 40/284* (2020.01)

(58) Field of Classification Search
 CPC .... G06F 40/30; G06F 16/2379; G06F 40/284; G06F 16/906
 See application file for complete search history.

(56) References Cited

U.S. PATENT DOCUMENTS

| 8,694,540 | B1 | 4/2014 | Lin |
| 9,098,617 | B1 | 8/2015 | Pauley, Jr. |
| 10,019,994 | B2 * | 7/2018 | Keen ...................... G06F 40/10 |
| 10,437,833 | B1 | 10/2019 | Nguyen |

(Continued)

FOREIGN PATENT DOCUMENTS

| CN | 101894170 A | 11/2010 |
| CN | 105335487 A | 2/2016 |
| CN | 108416008 A | 8/2018 |

OTHER PUBLICATIONS

Bouaziz, Philippe, "The Ultimate Out-of-the-box Automated Python Model Selection Methods", Towards Data Science, Medium, Aug. 12, 2020, 13 Pages.

(Continued)

*Primary Examiner* — Linda Wong
(74) *Attorney, Agent, or Firm* — Stephanie L. Carusillo

(57) ABSTRACT

In an approach for routing a user analytic request to a registry of analytics models and data sources and operationalizing the user analytic request, a processor receives a user analytic request. A processor applies natural language processing to the user analytic request. A processor associates a first set of vectors and a second set of vectors from the user analytic request to one or more analytics models and data sources by utilizing a plurality of domain-specific ontologies and a plurality of knowledge bases. A processor performs a semantic search for one or more concepts in the one or more analytics models and data sources. A processor receives the one or more concepts found in the one or more analytics models and data sources. A processor selects an analytics model to process the user analytic request. A processor executes the analytics model. A processor outputs a result to the user.

17 Claims, 4 Drawing Sheets

(56) References Cited

U.S. PATENT DOCUMENTS

| | | | |
|---|---|---|---|
| 10,515,313 B2 | 12/2019 | Kaplow | |
| 2013/0138696 A1 | 5/2013 | Turdakov | |
| 2013/0304758 A1* | 11/2013 | Gruber | G06F 16/248 707/769 |
| 2016/0132787 A1 | 5/2016 | Drevo | |
| 2017/0286832 A1* | 10/2017 | Ho | G06F 16/9535 |
| 2022/0327226 A1* | 10/2022 | Rich | G06F 16/2465 |

OTHER PUBLICATIONS

Cheng et al., "AutoML: Automating the design of machine learning models for autonomous driving", Waymo Team, Medium, Jan. 15, 2019, 6 Pages.

Fusi et al., "Probabilistic Matrix Factorization for Automated Machine Learning", Advances in Neural Information Processing Systems, arXiv: 1705.05355v2 [stat.ML], May 1, 2018, 14 Pages.

IBM, "AutoAI Overview", IBM Cloud Pak for Data, Oct. 19, 2020, 3 Pages.

Kerschke et al., "Automated Algorithm Selection: Survey and Perspectives", Evolutionary Computation, vol. 27, Issue 1, Nov. 19, 2018, © 2018 Massachusetts Institute of Technology, 43 Pages.

Shang et al., "Democratizing Data Science through Interactive Curation of ML Pipelines", Proceedings of the 2019 International Conference on Management of Data, SIGMOD '19, Jun. 30-Jul. 5, 2019, Amsterdam, Netherlands, 18 Pages.

Zoller et al., "Benchmark and Survey of Automated Machine Learning Frameworks", Journal of Artificial Intelligence Research 1, arXiv: 1904.12054v3 [cs.LG] Aug. 30, 2020, 65 Pages.

"Patent Cooperation Treaty PCT International Search Report", Applicant's File Reference: PF220602PCT, International Application No. PCT/CN2022/114479, International Filing Date: Aug. 24, 2022, dated Nov. 23, 2022, 10 pages.

Shen et al., "Review of Web Information Retrieval Based on Temporal Semantics", Journal of Library Science in China, Jul. 2018, 22 Pages.

* cited by examiner

CONTEXT-DRIVEN ANALYTICS SELECTION, ROUTING, AND MANAGEMENT

BACKGROUND OF THE INVENTION

The present invention relates generally to the field of data analytics, and more particularly to context-driven analytics selection, routing, and management.

Predictive analytics is a branch of advanced analytics that makes predictions about future outcomes using current and historical data combined with statistical modeling, data mining techniques, and machine learning. Data science and analytics teams leverage three types of models to make predictions: predictive analytics modeling, descriptive modeling, and decision-making modeling. A predictive analytics model is a statistical model that extracts information from current and historical datasets, identifies patterns and trends, and uses the information with a variety of statistical techniques, such as automated machine learning algorithms, deep learning, data mining, and artificial intelligence, to predict an array of outcomes. Popular predictive analytics models include classification models, clustering models, forecast models, outlier models, and time series models.

SUMMARY

Aspects of an embodiment of the present invention disclose a method, computer program product, and computer system for routing a user analytic request to a registry of models and data sources and operationalizing the user analytic request, either by executing a selected model for a user or by looking up said models and data sources, gathering output and returning a response to the user.

In some aspects of an embodiment of the present invention, a processor receives a user analytic request. A processor applies natural language processing to the user analytic request. A processor associates a first set of vectors and a second set of vectors from the user analytic request to one or more analytics models and data sources stored in an analytics model registry by utilizing a plurality of domain-specific ontologies and a plurality of knowledge bases. A processor performs a semantic search for one or more concepts of the first set of vectors and the second set of vectors to determine whether the one or more concepts are found in the one or more analytics models and data sources stored in the analytics model registry. A processor receives the one or more concepts found in the one or more analytics models and data sources stored in the analytics model registry during the semantic search. A processor selects an analytics model from the one or more analytics models and data sources stored in the analytics model registry to process the user analytic request. A processor executes the analytics model for a time selected by a user, at a range selected by the user, and at a latitude position and a longitude position selected by the user. A processor outputs a result of the analytics model to the user.

In some aspects of an embodiment of the present invention, a processor requests feedback from the user regarding the result of the analytics model. A processor receives the feedback from the user as a satisfaction rating. A processor applies the feedback from the user to an algorithm to improve an association between the user analytic request and the one or more analytics models and data sources stored in the analytics model registry.

In some aspects of an embodiment of the present invention, a processor captures one or more implicit user specific features from the user analytic request. A processor constructs a user vector from the one or more implicit user specific features from the user analytic request. A processor identifies one or more key inputs in the user analytic request, wherein the one or more key inputs include a context of the user analytic request and one or more requirements of the user analytic request. A processor constructs the first set of vectors based on the one or more key inputs identified in the user analytic request. A processor constructs the second set of vectors based on a knowledge base about the user. A processor appends the second set of vectors to the first set of vectors.

In some aspects of an embodiment of the present invention, the first set of vectors based on the one or more key inputs identified in the user analytic request includes a context vector, a requirements vector, and an augmentation vector.

In some aspects of an embodiment of the present invention, the second set of vectors based on the knowledge base about the user includes a regionality vector, an analytics vector, a seasonality vector, and a precision requirements vector.

In some aspects of an embodiment of the present invention, the knowledge base includes knowledge of a farming practice, a crop rotation pattern, an irrigation pattern, and a fertilization pattern of the user.

In some aspects of an embodiment of the present invention, a processor selects a domain-specific ontology based on the analytics vector. A processor captures associations that vary from a first domain of the plurality of domain-specific ontologies to a second domain of the plurality of domain-specific ontologies.

In some aspects of an embodiment of the present invention, a processor narrows the one or more analytics models and data sources stored in the analytics model registry to the one or more analytics models and data sources that contain the one or more concepts. A processor tracks a number of hops taken to discover the one or more concepts in the one or more analytics models and data sources stored in the analytics model registry. A processor calculates a confidence metric for each of the one or more analytics models and data sources stored in the analytics model registry based on the number of hops taken to discover the one or more concepts in the one or more analytics models and data sources stored in the analytics model registry. A processor ranks the one or more analytics models and data sources stored in the analytics model registry based on the confidence metric calculated.

In some aspects of an embodiment of the present invention, a processor determines the confidence metric exceeds a pre-set threshold.

In some aspects of an embodiment of the present invention, the algorithm includes a first weighting for the feedback from the user, a second weighting for a domain-specific ontology, and a third weighting for a location.

DETAILED DESCRIPTION

Embodiments of the present invention recognize that, while there are an infinite number of predictive analytics models available, the task of finding the predictive analytics model that is best suited to address a given problem can be difficult. Embodiments of the present invention recognize that the task of finding the predictive analytics model that is best suited to address a given problem is not only predicated on what the predictive analytics model does, but also on the ground truths against which the predictive analytics model was validated. Further, embodiments of the present invention recognize that the task of finding the predictive analytics model that is best suited involves analyzing the information needed to rebuild the predictive analytics model if, and when, it becomes stale. Therefore, embodiments of the present invention recognize that it is imperative to be able to manually select the predictive analytics model that is best suited to address a given problem from a registry of available models and data sources. Additionally, embodiments of the present invention recognize that it is imperative to be able to track not only the predictive analytics model itself, but also the performance capabilities and the context within which the predictive analytics model can be used. Lastly, embodiments of the present invention recognize that it is imperative to be able to obtain feedback from customers to understand when a predictive analytics model may be stale.

Embodiments of the present invention provide a system and method to route a user analytic request to a registry of models and data sources and to operationalize the user analytic request, either by executing a selected model for a user or by looking up said models and data sources, gathering output and returning a response to the user. Embodiments of the present invention provide a system and method to gather feedback from the user regarding the selected model result and to use the feedback to iteratively improve the association of the vectors and the analytics model registry over time.

Implementation of embodiments of the present invention may take a variety of forms, and exemplary implementation details are discussed subsequently with reference to the Figures.

Figure 1:
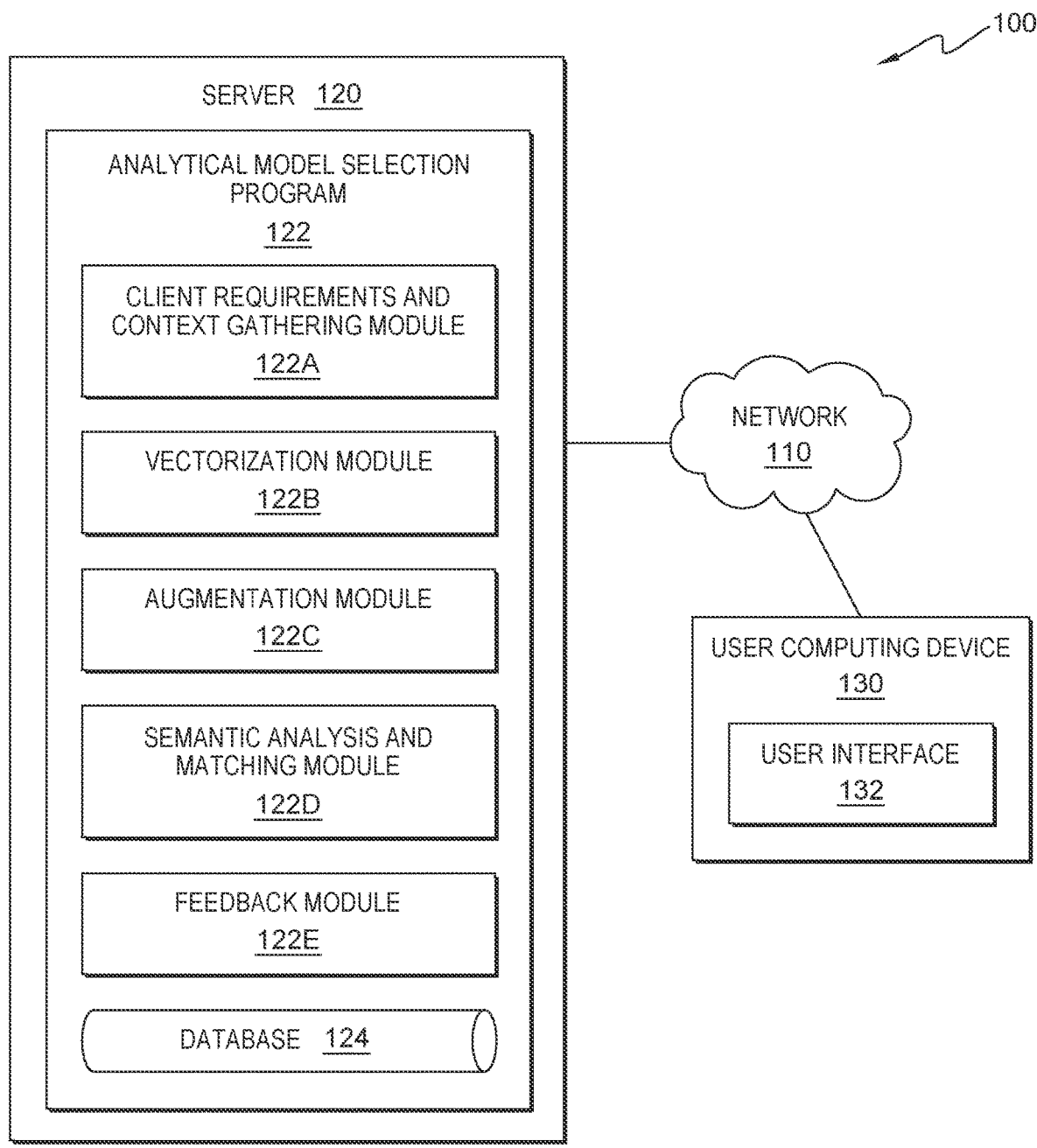
FIG. 1 is a block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, and other computing devices (not shown) within distributed data processing environment 100.

Server 120 operates to run analytical model selection program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 3.

Analytical model selection program 122 operates to route a user analytic request to a registry of models and data sources and to operationalize the user analytic request, either by executing a selected model for a user or by looking up said models and data sources, gathering output and returning a response to the user. Analytical model selection program 122 operates to gather feedback from the user regarding the selected model result and to use the feedback to iteratively improve the association of the vectors and the analytics model registry over time.

Client requirements and context gathering module 122A of analytical model selection program 122 operates to receive a user analytic request and to construct a user vector based on implicit user specific features and a first set of vectors based on the one or more key inputs identified in the user analytic request. Vectorization module 122B of analytical model selection program 122 operates to construct a second set of vectors based on the knowledge base that vectorization module 122B of analytical model selection program 122 has about the user. Augmentation module 122C of analytical model selection program 122 operates to append the second set of vectors to the first set of vectors. Semantic analysis and matching module 122D of analytical model selection program 122 operates to associate the first set of vectors and the second set of vectors to the analytics models and data sources; to perform a semantic search for one or more concepts of the first set of vectors and the second set of vectors in the one or more analytics models and data sources; to select an analytics model from the one or more analytics models and data sources; and to operationalize the user analytic request. Feedback module 122E of analytical model selection program 122 operates to gather feedback from the user regarding the selected model result and to use the feedback to iteratively improve the association of the vectors and the analytics model registry over time.

In the depicted embodiment, analytical model selection program 122 is a standalone program. In another embodiment, analytical model selection program 122 may be integrated into another software product. In the depicted embodiment, analytical model selection program 122 resides on server 120. In another embodiment, analytical model selection program 122 may reside on user computing device 130 or on another computing device (not shown), provided that analytical model selection program 122 has access to network 110. The operational steps of analytical model selection program 122 are depicted and described in further detail with respect to FIGS. 2A and 2B.

Database 124 operates as a repository for data received, used, and/or generated by analytical model selection program 122. A database is an organized collection of data. Data includes, but is not limited to, information about user preferences (e.g., general user system settings such as alert notifications for user computing device 130); information about alert notification preferences; the user analytic requests received; the user vector, the first set of vectors, and the second set of vectors constructed; the one or more concepts received from the semantic searches performed; the analytics models and data sources stored in the analytics model registry; the result from the execution of the selected analytics model; the feedback received from the user regarding the result of the execution of the selected analytics model; and any other data received, used, and/or generated by analytical model selection program 122.

Database 124 can be implemented with any type of device capable of storing data and configuration files that can be accessed and utilized by server 120, such as a hard disk drive, a database server, or a flash memory. In an embodiment, database 124 is accessed by analytical model selection program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that analytical model selection program 122 has access to database 124.

User computing device 130 operates to run user interface 132 through which a user can interact with analytical model selection program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with analytical model selection program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132. User computing device 130 may include components as described in further detail in FIG. 3.

User interface 132 operates as a local user interface between analytical model selection program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from analytical model selection program 122 to a user via network 110. User interface 132 can also display or present alerts including information (such as graphics, text, and/or sound) sent from analytical model selection program 122 to a user via network 110. In an embodiment, user interface 132 is capable of sending and receiving data (i.e., to and from analytical model selection program 122 via network 110, respectively). Through user interface 132, a user can set user preferences and alert notification preferences; input a user analytic request into a conversation chatbot or into a form provided on a web application; receive the model result from the execution of the selected model; receive the selected model with a rationale for selecting the model; review the selected model and the rationale for selecting the model; accept or reject the selected model; receive a request for feedback regarding the model result; and input feedback regarding the model result.

A user preference is a setting that can be customized for a particular user. A set of default user preferences are assigned to each user of analytical model selection program 122. A user preference editor can be used to update values to change the default user preferences. User preferences that can be customized include, but are not limited to, general user system settings, specific user profile settings for analytical model selection program 122, alert notification settings, and machine-learned data collection/storage settings. Machine-learned data includes, but is not limited to, data regarding past results of iterations of analytical model selection program 122 and a user's previous response to an alert notification sent by analytical model selection program 122. Analytical model selection program 122 self-learns by tracking user activity and improves with each iteration of analytical model selection program 122.

Figure 2A:
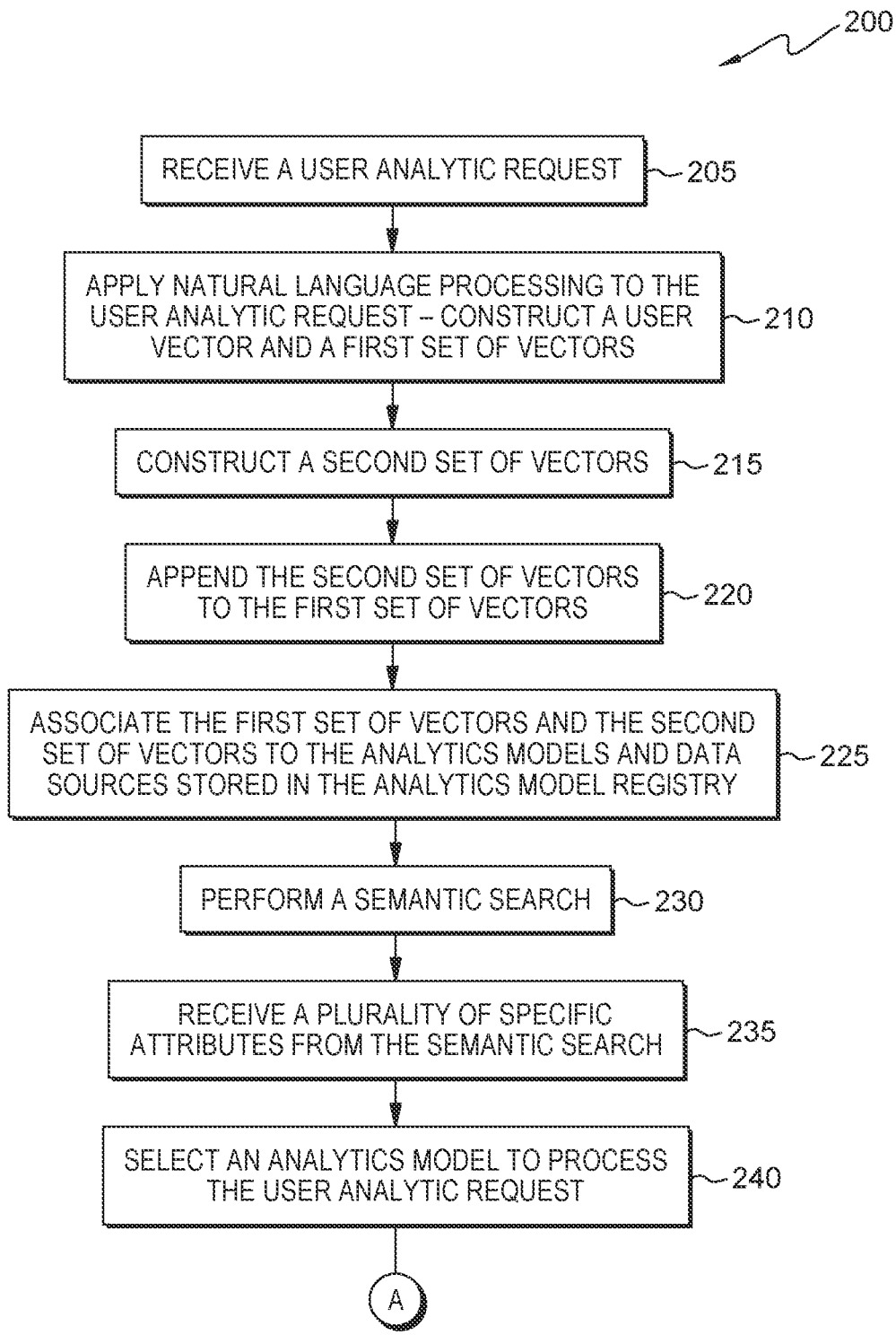
FIGS. 2A and 2B are a flowchart illustrating the operational steps of an analytical model selection program on a server in the distributed data processing environment, such as the one depicted in FIG. 1, in accordance with an embodiment of the present invention.
Figure 2B:
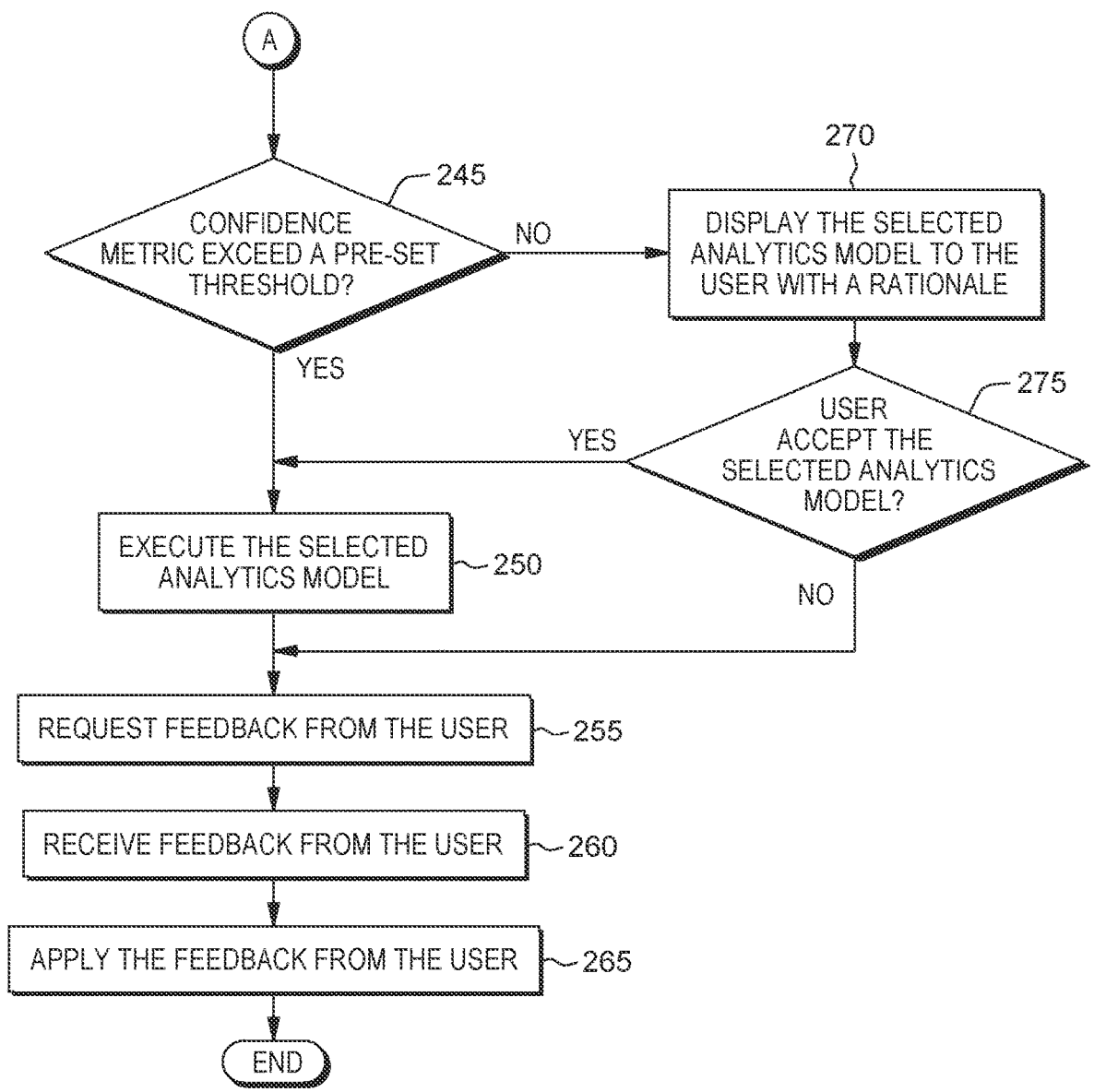

FIGS. 2A and 2B are a flowchart, generally designated 200, illustrating the operational steps of analytical model selection program 122 on server 120 in distributed data processing environment 100, such as the one depicted in FIG. 1, in accordance with an embodiment of the present invention. In an embodiment, analytical model selection program 122 operates to route a user analytic request to a registry of models and data sources and to operationalize the user analytic request, either by executing a selected model for a user or by looking up said models and data sources, gathering output and returning a response to the user. In an embodiment, analytical model selection program 122 operates to gather feedback from the user regarding the selected model result and to use the feedback to iteratively improve the association of the vectors and the analytics model registry over time. It should be appreciated that the process depicted in FIGS. 2A and 2B illustrate one possible iteration of the process flow, which may be repeated for each user analytic request received by analytical model selection program 122.

In step 205, client requirements and context gathering module 122A of analytical model selection program 122 receives a user analytic request (i.e., receives a user analytic request pertaining to a particular topic). In an embodiment, client requirements and context gathering module 122A of analytical model selection program 122 receives a user analytic request inputted into a conversation chatbot by a user through user interface 132 of user computing device 130. In another embodiment, client requirements and context gathering module 122A of analytical model selection program 122 receives a user analytic request inputted into a form on a web application by a user through user interface 132 of user computing device 130. A web application is software that executes on one or more user computing devices and that is accessed over a network such as the Internet by users though web browsers or other software that runs on user computing devices. In an embodiment, client requirements and context gathering module 122A of analytical model selection program 122 receives a user analytic request in natural language format.

For example, client requirements and context gathering module 122A of analytical model selection program 122 receives a user analytic request that states, "I'd like analytics that will help maximize the yield of palm in Malaysia during the upcoming 2021 growing season." In another example, client requirements and context gathering module 122A of analytical model selection program 122 receives a user analytic request that states, "We need data science to detect crop growing problems for corn in Iowa in season this year to hedge our downside risk due to low demand."

In step 210, client requirements and context gathering module 122A of analytical model selection program 122 applies natural language processing to the user analytic request. In an embodiment, responsive to client requirements and context gathering module 122A of analytical model selection program 122 receiving the user analytic request, client requirements and context gathering module 122A of analytical model selection program 122 applies natural language processing to the user analytic request. In an embodiment, client requirements and context gathering module 122A of analytical model selection program 122 captures implicit user specific features from the user analytic request that contextualize how a user might be best serviced by a response from the system. Implicit user specific features include, but are not limited to, the location of the user and the characteristics and bandwidth of the user's device. In an embodiment, client requirements and context gathering module 122A of analytical model selection program 122 constructs a user vector with the implicit user specific features. In an embodiment, client requirements and context gathering module 122A of analytical model selection program 122 identifies key inputs in the user analytic request. Key inputs in the user analytic request include, but are not limited to, a context of the user analytic request and one or more requirements of the user analytic request. In an embodiment, client requirements and context gathering module 122A of analytical model selection program 122 constructs a first set of vectors based on the one or more key inputs identified in the user analytic request. The first set of vectors based on the one or more key inputs identified in the user analytic request include, but are not limited to, a requirements vector, a context vector, and an augmentation vector. In an embodiment, client requirements and context gathering module 122A of analytical model selection program 122 outputs the user vector and the first set of vectors to vectorization module 122B of analytical model selection program 122.

Continuing the first example from above, client requirements and context gathering module 122A of analytical model selection program 122 applies natural language processing to the user analytic request that states, "I'd like analytics that will help maximize the yield of palm in Malaysia during the upcoming 2020 growing season." Client requirements and context gathering module 122A of analytical model selection program 122 identifies key inputs in the user analytic request to include "maximize yield," "palm," "Malaysia," and "2020 season."

Continuing the second example from above, client requirements and context gathering module 122A of analytical model selection program 122 applies natural language processing to the user analytic request that states, "We need data science to help detect crop growing problems for corn in Iowa in season this year to hedge our downside risk due to low demand." Client requirements and context gathering module 122A of analytical model selection program 122 identifies key inputs in the user analytic request to include "crop growing problem," "corn," "Iowa," "in season," "hedge," "downside risk," and "low demand."

In step 215, vectorization module 122B of analytical model selection program 122 constructs a second set of vectors. In an embodiment, responsive to client requirements and context gathering module 122A of analytical model selection program 122 applying natural language processing to the user analytic request, vectorization module 122B of analytical model selection program 122 constructs a second set of vectors. In an embodiment, vectorization module 122B of analytical model selection program 122 constructs a second set of vectors based on the knowledge that vectorization module 122B of analytical model selection program 122 has about the user. The knowledge base of vectorization module 122B of analytical model selection program 122 includes, but is not limited to, knowledge of a farming practice, a crop rotation pattern, an irrigation pattern, and/or a fertilization pattern of the user. The second set of vectors based on the knowledge base about the user includes, but is not limited to, a regionality vector, an analytics vector, a seasonality vector, and a precision requirements vector. The regionality vector represents, for example, the county, the region, the country, and/or the latitude/longitude position of the user. The analytics vector represents, for example, the one or more crops the user is growing and/or the user's objective or goal for using a model. The seasonality vector represents, for example, the month, year, and/or season during which the user is growing one or more crops. The precision vector represents, for example, the rating, accuracy, precision, recall, and/or f-score of a model. In an embodiment, vectorization module 122B of analytical model selection program 122 ranks the second set of vectors. In an embodiment, vectorization module 122B of analytical model selection program 122 outputs the user vector, the first set of vectors, and the second set of vectors to augmentation module 122C of analytical model selection program 122.

In step 220, augmentation module 122C of analytical model selection program 122 appends the second set of vectors to the first set of vectors. In an embodiment, responsive to vectorization module 122B of analytical model selection program 122 constructing a second set of vectors, augmentation module 122C of analytical model selection program 122 appends the second set of vectors to the first set of vectors. In an embodiment, augmentation module 122C of analytical model selection program 122 outputs the user vector, the first set of vectors, and the second set of vectors to semantic analysis and matching module 122D of analytical model selection program 122.

In step 225, semantic analysis and matching module 122D of analytical model selection program 122 associates the first set of vectors and the second set of vectors to the analytics models and data sources stored in the analytics model registry. In an embodiment, responsive to augmentation module 122C of analytical model selection program 122 appending the second set of vectors to the first set of vectors, semantic analysis and matching module 122D of analytical model selection program 122 associates the first set of vectors and the second set of vectors to the analytics models and data sources stored in the analytics model registry. The analytics model registry is a registry of all available models and data sources. In an embodiment, semantic analysis and matching module 122D of analytical model selection program 122 associates the first set of vectors and the second set of vectors to the analytics models and data sources stored in the analytics model registry by bootstrapping the association with the help of a subject matter expert or a domain expert. In another embodiment, semantic analysis and matching module 122D of analytical model selection program 122 associates the first set of vectors and the second set of vectors to the analytics models and data sources stored in the analytics model registry by utilizing a plurality of domain-specific ontologies and a plurality of knowledge bases.

In an embodiment, semantic analysis and matching module 122D of analytical model selection program 122 selects a domain-specific ontology based on the analytics vector. An ontology is a formal description of knowledge as a set of concepts within a domain of discourse (i.e., classes), of features and attributes of the concepts (i.e., slots), and of restrictions on the concepts (i.e., facets). An ontology together with a set of individual instances of classes constitutes a knowledge base. An ontology is a way of showing the properties of a subject area and how they are related, by defining a set of concepts and categories that represent the subject. To enable such a description, the components are formally specified as individuals (i.e., instances of objects), classes, attributes, and relations as well as restrictions, rules, and axioms. An ontology data model is applied to a set of individual facts to create a knowledge graph—a collection of entities, where the types and the relationships between them are expressed by nodes and edges between the nodes. A domain-specific ontology represents concepts that belong to a realm of the world. Each domain-specific ontology models domain-specific definitions of terms. For example, an ontology about the domain of agriculture includes, but is not limited to, terms such as farmer, crop, weed, environmental factors, soil, water, $CO_2$, sunlight, wind, temperature, humidity, growing problems, insectpest, nematodepest, disease, cultural disease control, chemical disease control, biological disease control, etc.

Continuing the first example from above, the user's objective for using the model is to maximize the yield of palm in Malaysia during the upcoming 2020 growing season. Based on the user's objective for using the model, semantic analysis and matching module 122D of analytical model selection program 122 selects an agriculture specific ontology.

In an embodiment, semantic analysis and matching module 122D of analytical model selection program 122 captures associations that vary from a first domain of the plurality of domain-specific ontologies (e.g., Agriculture) to a second domain of the plurality of domain-specific ontologies (e.g., Finance).

In step 230, semantic analysis and matching module 122D of analytical model selection program 122 performs a semantic search (i.e., walks a semantic graph). In an embodiment, responsive to semantic analysis and matching module 122D of analytical model selection program 122 associating the first set of vectors and the second set of vectors to the analytics models and data sources stored in the analytics model registry, semantic analysis and matching module 122D of analytical model selection program 122 performs a semantic search. A semantic search is performed by processing an entered search query; understanding not just the direct sense but possible interpretations as well; looking for patterns between the subject, the predicate, and the object, where the subject and the object are concepts in an ontology or a knowledge graph, while the predicate is the relationships or the connection; creating associations; and then searching for relevant entries in the database. The semantic search discovers successive concepts that are connected by edges and are not terminal.

In an embodiment, semantic analysis and matching module 122D of analytical model selection program 122 performs a semantic search for one or more concepts of the first set of vectors and the second set of vectors. In an embodiment, semantic analysis and matching module 122D of analytical model selection program 122 performs a semantic search to determine whether the one or more concepts are found in the analytics models and data sources stored in the analytics model registry. In an embodiment, semantic analysis and matching module 122D of analytical model selection program 122 waits until the semantic search is complete before proceeding to step 235, receiving the one or more concepts found in the analytics models and data sources stored in the analytics model registry during the semantic search.

Continuing the second example from above, client requirements and context gathering module 122A of analytical model selection program 122 receives a user analytic request that states, "We need data science to help detect crop growing problems for corn in Iowa in season this year to hedge our downside risk due to low demand." Semantic analysis and matching module 122D of analytical model selection program 122 performs a semantic search for the concepts, "crop" and "growing problems". Semantic analysis and matching module 122D of analytical model selection program 122 determines that a "crop" is impacted by environmental factors including, but not limited to, rainfall, soil, and humidity. Semantic analysis and matching module 122D of analytical model selection program 122 also determines that "growing problems" are associated with concepts related to 'disease' and 'weed'.

In step 235, semantic analysis and matching module 122D of analytical model selection program 122 receives the one or more concepts found in the analytics models and data sources stored in the analytics model registry during the semantic search. In an embodiment, responsive to semantic analysis and matching module 122D of analytical model selection program 122 performing the semantic search, semantic analysis and matching module 122D of analytical model selection program 122 receives the one or more concepts found in the analytics models and data sources stored in the analytics model registry during the semantic search. The one or more concepts received from the semantic search include, but are not limited to, a domain type, a version of crop, a type of crop, and a metric used. In an embodiment, semantic analysis and matching module 122D of analytical model selection program 122 narrows the analytics models and data sources stored in the analytics model registry to the analytics models and data sources that contain the one or more concepts.

Continuing the second example from above, semantic analysis and matching module 122D of analytical model selection program 122 searches the analytics models and data sources stored in the analytics model registry for the following concepts: (i) "disease/weed detection" for corn in Iowa, (ii) soil properties layer for Iowa, (iii) rainfall and precipitation data for Iowa, and (iv) demand estimation model. Semantic analysis and matching module 122D of analytical model selection program 122 narrows the analytics models and data sources stored in the analytics model registry to those that contain the one or more concepts.

In an embodiment, semantic analysis and matching module 122D of analytical model selection program 122 tracks a number of hops. In an embodiment, semantic analysis and matching module 122D of analytical model selection program 122 tracks the number of hops taken to discover the one or more concepts in the analytics models and data sources that contain the one or more concepts.

Continuing the second example from above, the concept "growing problem" was related to the concept "disease/weed detection" for corn in Iowa. Only a single hop was taken to discover the relationship between the concepts "growing problem" and "disease/weed detection." Therefore, the number of hops (h) is h=1.

In an embodiment, semantic analysis and matching module 122D of analytical model selection program 122 calculates a confidence metric. In an embodiment, semantic analysis and matching module 122D of analytical model selection program 122 calculates a confidence metric for each of the analytics models and data sources that contain the one or more concepts. In an embodiment, semantic analysis and matching module 122D of analytical model selection program 122 calculates a confidence metric based on the number of hops taken to discover the one or more concepts in the analytics models and data sources. The confidence metric is associated with the analytics models and data sources that contain the one or more concepts. The confidence metric (c) is defined as $c=1/(1+avg(h))$. $Avg(h)$ is defined as the average number of hops taken to discover the one or more concepts in the analytics models and data sources. An inverse relationship exists. Therefore, the fewer the average hops, the higher the confidence metric is. In an embodiment, semantic analysis and matching module 122D of analytical model selection program 122 ranks the analytics models and data sources based on the calculated confidence metric.

In step 240, semantic analysis and matching module 122D of analytical model selection program 122 selects an analytics model to process the user analytic request. In an embodiment, responsive to semantic analysis and matching module 122D of analytical model selection program 122 receiving the one or more concepts found in the analytics models and data sources stored in the analytics model registry during the semantic search, semantic analysis and matching module 122D of analytical model selection program 122 selects an analytics model to process the user analytic request. In an embodiment, semantic analysis and matching module 122D of analytical model selection program 122 selects the analytics model from the analytics models and data sources stored in the analytics model registry to process the user analytic request. In an embodiment, semantic analysis and matching module 122D of analytical model selection program 122 selects the analytics model based on the ranking of the analytics models and data sources.

In decision 245, semantic analysis and matching module 122D of analytical model selection program 122 determines whether the confidence metric exceeds a pre-set threshold. In an embodiment, responsive to semantic analysis and matching module 122D of analytical model selection program 122 selecting the analytics model to process the user analytic request, semantic analysis and matching module 122D of analytical model selection program 122 determines whether the confidence metric exceeds a pre-set threshold. In an embodiment, the threshold is pre-set at 0.25. If semantic analysis and matching module 122D of analytical model selection program 122 determines the confidence metric exceeds the pre-set threshold (i.e., $c>0.25$) (decision 245, YES branch), then semantic analysis and matching module 122D of analytical model selection program 122 proceeds to step 250, executing the selected analytics model. If semantic analysis and matching module 122D of analytical model selection program 122 determines the confidence metric does not exceed the pre-set threshold (i.e., $c<0.25$) (decision 245, NO branch), then semantic analysis and matching module 122D of analytical model selection program 122 proceeds to step 270, displaying the selected analytics model to the user with a rationale.

In step 250, semantic analysis and matching module 122D of analytical model selection program 122 executes the selected analytics model. In an embodiment, responsive to semantic analysis and matching module 122D of analytical model selection program 122 determining the confidence metric exceeds a pre-set threshold, semantic analysis and matching module 122D of analytical model selection program 122 executes the selected analytics model. In an embodiment, semantic analysis and matching module 122D of analytical model selection program 122 executes the selected analytics model for a time selected by the user, at a range selected by the user, and at a latitude position and a longitude position selected by the user. In another embodiment, semantic analysis and matching module 122D of analytical model selection program 122 looks up said data sources for the time selected by the user, at the range selected by the user, and at the latitude position and the longitude position selected by the user. In an embodiment, semantic analysis and matching module 122D of analytical model selection program 122 receives a result from the execution of the selected analytics model. In another embodiment, semantic analysis and matching module 122D of analytical model selection program 122 receives a result when a data source is found. In an embodiment, semantic analysis and matching module 122D of analytical model selection program 122 outputs the result (i.e., the result of the user analytic request) from the execution of the selected analytics model to the user. In an embodiment, semantic analysis and matching module 122D of analytical model selection program 122 outputs the result from the execution of the selected analytics model to the user through user interface 132 of user computing device 130.

In step 255, feedback module 122E of analytical model selection program 122 requests feedback from the user. In an embodiment, responsive to semantic analysis and matching module 122D of analytical model selection program 122 executing the selected analytics model, feedback module 122E of analytical model selection program 122 requests feedback from the user. In an embodiment, feedback module 122E of analytical model selection program 122 requests feedback from the user regarding the result of the execution of the selected analytics model. In an embodiment, feedback module 122E of analytical model selection program 122 requests feedback from the user through user interface 132 of user computing device 130.

In step 260, feedback module 122E of analytical model selection program 122 receives feedback from the user. In an embodiment, responsive to feedback module 122E of analytical model selection program 122 requesting feedback from the user, feedback module 122E of analytical model selection program 122 receives feedback from the user. In an embodiment, feedback module 122E of analytical model selection program 122 receives feedback from the user regarding the result of the execution of the selected analytics model. In an embodiment, feedback module 122E of analytical model selection program 122 receives feedback from the user regarding the result of the execution of the selected analytics model as a satisfaction rating. In an embodiment, feedback module 122E of analytical model selection program 122 receives feedback from the user through user interface 132 of user computing device 130. In an embodiment, feedback module 122E of analytical model selection program 122 stores the feedback from the user in a database, e.g., database 124.

In step 265, feedback module 122E of analytical model selection program 122 applies the feedback received from the user. In an embodiment, responsive to feedback module 122E of analytical model selection program 122 receiving feedback from the user, feedback module 122E of analytical model selection program 122 applies the feedback received from the user. In an embodiment, feedback module 122E of analytical model selection program 122 applies the feedback received from the user to an algorithm. The algorithm includes a first weighting for the feedback received from the user, a second weighting for a domain-specific ontology, and a third weighting for a location. In an embodiment, feedback module 122E of analytical model selection program 122 applies the feedback received from the user by adjusting the algorithm to improve the association between the user analytic request and the analytics models and data sources stored in the analytics model registry.

In another embodiment, feedback module 122E of analytical model selection program 122 engages a subject matter expert to improve the association of requirements and the context to the available model results and data sources by iteratively improving the domain-specific knowledge base. In an embodiment, feedback module 122E of analytical model selection program 122 introduces one or more new analytics models and data sources into the knowledge base. In another embodiment, feedback module 122E of analytical model selection program 122 introduces one or more new analytics models and data sources into an entirely new domain by inserting corresponding domain-specific ontology (e.g., Finance instead of Agriculture) while keeping the rest of the system functionality the same. In an embodiment, feedback module 122E of analytical model selection program 122 expresses a purpose of the one or more new analytics models and data sources in a form that can be matched with the context of the user analytic request and the one or more requirements of the user analytic request when performing a future semantic search. In an embodiment, feedback module 122E of analytical model selection program 122 iteratively improves the domain-specific knowledge base.

Returning to step 270, semantic analysis and matching module 122D of analytical model selection program 122 displays the selected analytics model to the user with a rationale. In an embodiment, responsive to semantic analysis and matching module 122D of analytical model selection program 122 determining the confidence metric does not exceeds a pre-set threshold (i.e., c<0.25), semantic analysis and matching module 122D of analytical model selection program 122 displays the selected analytics model to the user with a rationale. The rationale includes the results of the semantic search and the number of hops taken to discover the one or more concepts in the analytics models and data sources stored in the analytics model registry. In an embodiment, semantic analysis and matching module 122D of analytical model selection program 122 displays the selected analytics model to the user with a rationale through user interface 132 of user computing device 130. In an embodiment, semantic analysis and matching module 122D of analytical model selection program 122 enables the user to review the selected analytics model along with the rationale provided through user interface 132 of user computing device 130. In an embodiment, semantic analysis and matching module 122D of analytical model selection program 122 enables the user to accept or to reject the selected analytics model through user interface 132 of user computing device 130.

In decision 275, semantic analysis and matching module 122D of analytical model selection program 122 determines whether the user accepted or rejected the selected analytics model. In an embodiment, responsive to semantic analysis and matching module 122D of analytical model selection program 122 displaying the selected analytics model to the user with a rationale, semantic analysis and matching module 122D of analytical model selection program 122 determines whether the user accepted or rejected the selected analytics model. If semantic analysis and matching module 122D of analytical model selection program 122 determines that the user accepted the selected analytics model (decision 275, YES branch), then semantic analysis and matching module 122D of analytical model selection program 122 returns to step 250, executing the selected analytics model. If semantic analysis and matching module 122D of analytical model selection program 122 determines that the user has not accepted the selected analytics model (decision 275, NO branch), then then semantic analysis and matching module 122D of analytical model selection program 122 returns to step 255, requesting feedback from the user.

Figure 3:
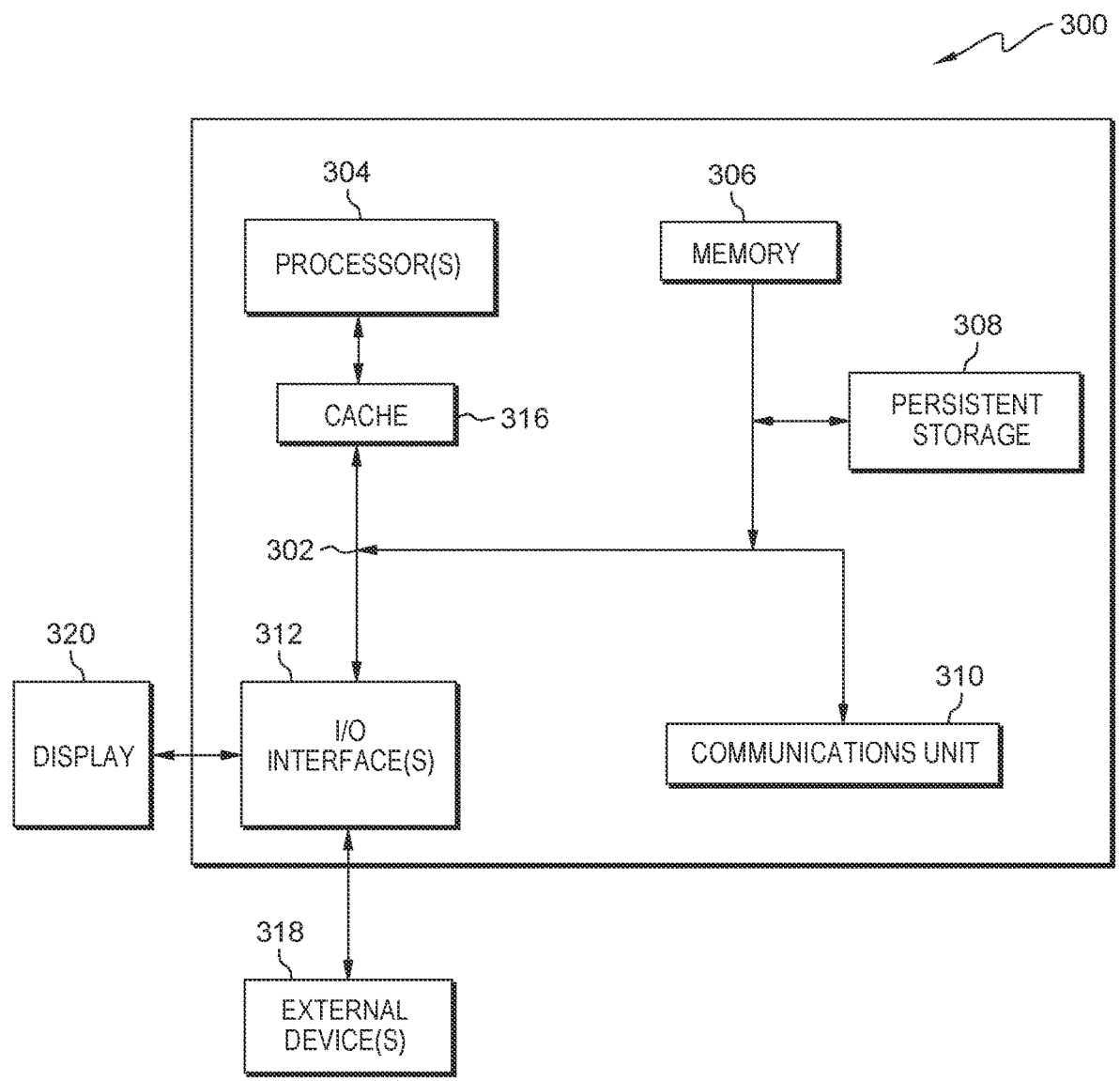
FIG. 3 is a block diagram illustrating the components of a computing device in the distributed data processing environment, such as the one depicted in FIG. 1, in accordance with an embodiment of the present invention.

FIG. 3 is a block diagram illustrating the components of computing device 300 in distributed data processing environment 100, such as the one depicted in FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made. Computing device 300 includes processor(s) 304, memory 306, cache 316, communications fabric 302, persistent storage 308, input/output (I/O) interface(s) 312, and communications unit 310. Communications fabric 302 provides communications between memory 306, cache 316, persistent storage 308, input/output (I/O) interface(s) 312, and communications unit 310. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a cross switch. Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Program instructions and data (e.g., software and data) used to practice embodiments of the present invention may be stored in persistent storage 308 and in memory 306 for execution by one or more of the respective processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308. Software and data can be stored in persistent storage 308 for access and/or execution by one or more of the respective processor(s) 304 via cache 316. With respect to user computing device 130, software and data includes user interface 132. With respect to server 120, software and data includes analytical model selection program 122.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data (e.g., software and data) used to practice embodiments of the present invention may be downloaded to persistent storage 308 through communications unit 310.

I/O interface(s) 312 allows for input and output of data with other devices that may be connected to each computer system. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Program instructions and data (e.g., software and data) used to practice embodiments of the present invention can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a user analytic request;
   applying, by the one or more processors, natural language processing to the user analytic request;
   associating, by the one or more processors, a first set of vectors and a second set of vectors from the user analytic request to one or more analytics models and data sources stored in an analytics model registry by utilizing a plurality of domain-specific ontologies and a plurality of knowledge bases;
   performing, by the one or more processors, a semantic search for one or more concepts of the first set of vectors and the second set of vectors to determine whether the one or more concepts are found in the one or more analytics models and data sources stored in the analytics model registry, wherein the step of performing further comprises:
      narrowing, by the one or more processors, the one or more analytics models and data sources stored in the analytics model registry to the one or more analytics models and data sources that contain the one or more concepts;
      tracking, by the one or more processors, a number of hops taken to discover the one or more concepts in the one or more analytics models and data sources stored in the analytics model registry;
      calculating, by the one or more processors, a confidence metric for each of the one or more analytics models and data sources stored in the analytics model registry based on the number of hops taken to discover the one or more concepts in the one or more analytics models and data sources stored in the analytics model registry; and
      ranking, by the one or more processors, the one or more analytics models and data sources stored in the analytics model registry based on the confidence metric calculated;
   selecting, by the one or more processors, an analytics model from the one or more analytics models and data sources stored in the analytics model registry to process the user analytic request; and
   executing, by the one or more processors, the analytics model for a time selected by a user, at a range selected by the user, and at a latitude position and a longitude position selected by the user.

2. The computer-implemented method of claim 1, further comprising:
   requesting, by the one or more processors, feedback from the user regarding the result of the analytics model;
   receiving, by the one or more processors, the feedback from the user as a satisfaction rating; and
   applying, by the one or more processors, the feedback from the user to an algorithm to improve an association between the user analytic request and the one or more analytics models and data sources stored in the analytics model registry.

3. The computer-implemented method of claim 1, wherein applying natural language processing to the user analytic request further comprises:
   capturing, by the one or more processors, one or more implicit user specific features from the user analytic request;
   constructing, by the one or more processors, a user vector from the one or more implicit user specific features from the user analytic request;
   identifying, by the one or more processors, one or more key inputs in the user analytic request, wherein the one or more key inputs include a context of the user analytic request and one or more requirements of the user analytic request;
   constructing, by the one or more processors, the first set of vectors based on the one or more key inputs identified in the user analytic request;
   constructing, by the one or more processors, the second set of vectors based on a knowledge base about the user; and
   appending, by the one or more processors, the second set of vectors to the first set of vectors.

4. The computer-implemented method of claim 3, wherein the first set of vectors based on the one or more key inputs identified in the user analytic request includes a context vector, a requirements vector, and an augmentation vector.

5. The computer-implemented method of claim 3, wherein the second set of vectors based on the knowledge base about the user includes a regionality vector, an analytics vector, a seasonality vector, and a precision requirements vector.

6. The computer-implemented method of claim 3, wherein the knowledge base includes knowledge of a farming practice, a crop rotation pattern, an irrigation pattern, and a fertilization pattern of the user.

7. The computer-implemented method of claim 5, wherein associating the first set of vectors and the second set of vectors to the one or more analytics models and data sources stored in the analytics model registry further comprises:
   selecting, by the one or more processors, a domain-specific ontology based on the analytics vector; and
   capturing, by the one or more processors, associations that vary from a first domain of the plurality of domain-specific ontologies to a second domain of the plurality of domain-specific ontologies.

8. The computer-implemented method of claim 1, wherein selecting the analytics model from the one or more analytics models and data sources stored in the analytics model registry ranked to process the user analytic request further comprises:
   determining, by the one or more processors, the confidence metric exceeds a pre-set threshold.

9. The computer-implemented method of claim 2, wherein the algorithm includes a first weighting for the feedback from the user, a second weighting for a domain-specific ontology, and a third weighting for a location.

10. A computer program product comprising:
    one or more computer readable storage media and program instructions stored on the one or more computer readable storage media, the program instructions comprising:
    program instructions to receive a user analytic request;
    program instructions to apply natural language processing to the user analytic request;
    program instructions to associate a first set of vectors and a second set of vectors from the user analytic request to one or more analytics models and data sources stored in an analytics model registry by utilizing a plurality of domain-specific ontologies and a plurality of knowledge bases;
    program instructions to perform a semantic search for one or more concepts of the first set of vectors and the second set of vectors to determine whether the one or more concepts are found in the one or more analytics models and data sources stored in the analytics model registry, wherein the step of performing further comprises:
       program instructions to narrow the one or more analytics models and data sources stored in the analytics model registry to the one or more analytics models and data sources that contain the one or more concepts;
       program instructions to track a number of hops taken to discover the one or more concepts in the one or more analytics models and data sources stored in the analytics model registry;
       program instructions to calculate a confidence metric for each of the one or more analytics models and data sources stored in the analytics model registry based on the number of hops taken to discover the one or more concepts in the one or more analytics models and data sources stored in the analytics model registry; and
       program instructions to rank the one or more analytics models and data sources stored in the analytics model registry based on the confidence metric calculated;
    program instructions to select an analytics model from the one or more analytics models and data sources stored in the analytics model registry to process the user analytic request; and
    program instructions to execute the analytics model for a time selected by a user, at a range selected by the user, and at a latitude position and a longitude position selected by the user.

11. The computer program product of claim 10, further comprising:
    program instructions to request feedback from the user regarding the result of the analytics model;
    program instructions to receive the feedback from the user as a satisfaction rating; and
    program instructions to apply the feedback from the user to an algorithm to improve an association between the user analytic request and the one or more analytics models and data sources stored in the analytics model registry.

12. The computer program product of claim 10, wherein applying natural language processing to the user analytic request further comprises:
    program instructions to capture one or more implicit user specific features from the user analytic request;

program instructions to construct a user vector from the one or more implicit user specific features from the user analytic request;
program instructions to identify one or more key inputs in the user analytic request, wherein the one or more key inputs include a context of the user analytic request and one or more requirements of the user analytic request;
program instructions to construct the first set of vectors based on the one or more key inputs identified in the user analytic request;
program instructions to construct the second set of vectors based on a knowledge base about the user; and
program instructions to append the second set of vectors to the first set of vectors.

13. The computer program product of claim 10, wherein selecting the analytics model from the one or more analytics models and data sources stored in the analytics model registry ranked to process the user analytic request further comprises:
program instructions to determine the confidence metric exceeds a pre-set threshold.

14. A computer system comprising:
one or more computer processors;
one or more computer readable storage media;
program instructions collectively stored on the one or more computer readable storage media for execution by at least one of the one or more computer processors, the stored program instructions comprising:
program instructions to receive a user analytic request;
program instructions to apply natural language processing to the user analytic request;
program instructions to associate a first set of vectors and a second set of vectors from the user analytic request to one or more analytics models and data sources stored in an analytics model registry by utilizing a plurality of domain-specific ontologies and a plurality of knowledge bases;
program instructions to perform a semantic search for one or more concepts of the first set of vectors and the second set of vectors to determine whether the one or more concepts are found in the one or more analytics models and data sources stored in the analytics model registry, wherein the step of performing further comprises:
  program instructions to narrow the one or more analytics models and data sources stored in the analytics model registry to the one or more analytics models and data sources that contain the one or more concepts;
  program instructions to track a number of hops taken to discover the one or more concepts in the one or more analytics models and data sources stored in the analytics model registry;
  program instructions to calculate a confidence metric for each of the one or more analytics models and data sources stored in the analytics model registry based on the number of hops taken to discover the one or more concepts in the one or more analytics models and data sources stored in the analytics model registry; and
  program instructions to rank the one or more analytics models and data sources stored in the analytics model registry based on the confidence metric calculated;
program instructions to select an analytics model from the one or more analytics models and data sources stored in the analytics model registry to process the user analytic request; and
program instructions to execute the analytics model for a time selected by a user, at a range selected by the user, and at a latitude position and a longitude position selected by the user.

15. The computer system of claim 14, further comprising:
program instructions to request feedback from the user regarding the result of the analytics model;
program instructions to receive the feedback from the user as a satisfaction rating; and
program instructions to apply the feedback from the user to an algorithm to improve an association between the user analytic request and the one or more analytics models and data sources stored in the analytics model registry.

16. The computer system of claim 14, wherein applying natural language processing to the user analytic request further comprises:
program instructions to capture one or more implicit user specific features from the user analytic request;
program instructions to construct a user vector from the one or more implicit user specific features from the user analytic request;
program instructions to identify one or more key inputs in the user analytic request, wherein the one or more key inputs include a context of the user analytic request and one or more requirements of the user analytic request;
program instructions to construct the first set of vectors based on the one or more key inputs identified in the user analytic request;
program instructions to construct the second set of vectors based on a knowledge base about the user; and
program instructions to append the second set of vectors to the first set of vectors.

17. The computer system of claim 14, wherein selecting the analytics model from the one or more analytics models and data sources stored in the analytics model registry ranked to process the user analytic request further comprises:
program instructions to determine the confidence metric exceeds a pre-set threshold.

* * * * *